United States Patent
Cradduck et al.

[11] Patent Number: 5,915,739
[45] Date of Patent: Jun. 29, 1999

[54] CLAMP RETENTION DEVICE

[75] Inventors: Kevin M. Cradduck, Christiana; Craig A. Senovich, Murfreesboro, both of Tenn.

[73] Assignee: ACD Tridon Inc., Burlington, Canada

[21] Appl. No.: 08/909,106

[22] Filed: Aug. 12, 1997

[51] Int. Cl.⁶ .................................................. F16L 33/02
[52] U.S. Cl. ........................... 285/114; 285/252; 285/23; 285/242
[58] Field of Search .............................. 285/23, 114, 242, 285/252, 253

[56] References Cited

U.S. PATENT DOCUMENTS

| | | | |
|---|---|---|---|
| 3,249,370 | 5/1966 | Brogden | 285/114 |
| 3,295,548 | 1/1967 | Woods | 285/114 |
| 3,365,218 | 1/1968 | Denyes | 285/253 |
| 3,389,442 | 6/1968 | Tetzlaff | 285/252 |
| 3,407,448 | 10/1968 | Tetzlaff et al. | 285/253 |
| 3,407,449 | 10/1968 | Tetzlaff et al. | 24/19 |
| 4,592,575 | 6/1986 | Hughes et al. | 285/253 |
| 4,882,814 | 11/1989 | Takahashi | 24/20 R |
| 5,002,094 | 3/1991 | Brovont | 285/252 |
| 5,145,218 | 9/1992 | Worley et al. | 285/243 |
| 5,185,913 | 2/1993 | Campo et al. | 29/453 |
| 5,234,233 | 8/1993 | Fix | 285/23 |
| 5,309,607 | 5/1994 | Hohmann et al. | 24/274 R |
| 5,405,170 | 4/1995 | Roulinson et al. | 285/114 |
| 5,456,784 | 10/1995 | Cogdill et al. | 285/253 |
| 5,620,209 | 4/1997 | Sauer | 285/23 |
| 5,675,871 | 10/1997 | Webb et al. | 24/20 R |
| 5,749,603 | 5/1998 | Mann | 285/23 |
| 5,772,258 | 6/1998 | Dyer et al. | 285/114 |

FOREIGN PATENT DOCUMENTS

| | | | |
|---|---|---|---|
| 8805587 | 4/1988 | France . | |
| 2630808 | 11/1989 | France | 285/253 |
| 3543717 | 6/1987 | Germany . | |
| 19533553 A1 | 3/1997 | Germany . | |
| 2205137 | 11/1988 | United Kingdom | 285/114 |
| 2253666 | 9/1992 | United Kingdom | 285/114 |

*Primary Examiner*—Eric K. Nicholson
*Attorney, Agent, or Firm*—Rogers & Scott

[57] ABSTRACT

A retention device is provided for positioning and retaining an open generally cylindrical hose clamp on a selected hose. The device extends generally about a longitudinal axis and has a retainer and a locator spaced axially from the retainer in side-by-said relationship. The locator and retainer are coupled together and the locator is adapted to hold the clamp while the retainer is adapted to engage the hose to maintain the device in position on the hose. As a result, the clamp can be positioned orthogonally relative to the hose and the assembly is then ready for engagement on a rigid tubular fitting with the locator positioned on the hose remote from the tubular fitting. This permits the hose to be engaged over the tubular fitting with no direct resistance from the retention device.

11 Claims, 2 Drawing Sheets

CLAMP RETENTION DEVICE

FIELD OF THE INVENTION

This invention relates to securing deformable hoses on rigid tubular fittings such as those found in automobile engines to provide fluid flow between the fittings. More particularly the invention relates to a hose clamp retention device to position and retain a clamp on a hose ready to be activated after the hose has been positioned over one of the rigid tubular fittings.

BACKGROUND OF THE INVENTION

Hose clamps have been designed in a great variety of forms which fall into three general types. A first of these types is a continuous band which includes an upstanding portion or "ear" which can be deformed after assembly to tension the band around a hose. Such clamps are sometimes referred to as "Oetiker" clamps after the inventor. The clamps are engaged on a hose by using a special tool to deform the ear and thereby tension the band to apply a compressive radial stress on the hose.

A second type of clamp includes a mechanical actuator, such as a worm screw, acting directly on a band to bring the band into firm engagement with the hose. Lastly, the third type is a clamp of spring steel made to have a diameter slightly less than that of the outside diameter of the hose. As a result, when the clamp is pre-loaded by deforming it to enlarge the clamp, there will be stored energy in the clamp which can be released to apply a compressive radial force to hold the clamp on the hose.

A variation to the pre-loaded type is a clamp made of spring steel; and shaped to be enlarged into an open position at the point of manufacture to store energy. The clamp is retained in this open condition either by built-in structure or by a keeper in the form of a clip. In use the clamp is released over the hose to clamp the hose.

It has become common practice to pre-assemble clamps on a hose and provide this assembly to the automobile assembly line. The clamps are typically placed on the hose and either glued in position at a point diametrically opposite the restraining structure or held in place by a clamp retention device which engages the hose to hold the clamp in place. The clamp is then in place to be released closed into a condition to apply a radial compressive load on the hose.

Examples of such clamp retention devices are found in U.S. Pat. Ser. Nos. 4,882,814 and 5,234,233. Typically, such structures are arranged about the clamp at the location of the clamp on the hose. Consequently, when the hose is pushed on to a rigid tubular fitting the hose must be free to expand slightly and this expansion can be impeded by the mechanical structure. This is because the structure usually applies some form of radial compression on the tube in order to hold the structure, and hence the clamp, in place on the hose.

Accordingly, it is one of the objects of the present invention to minimize the effect of a clamp retaining structure on the normal procedure for placing an prestressed open clamp on a hose and then engaging the hose on a rigid tubular fitting.

SUMMARY OF THE INVENTION

A retention device is provided for positioning and retaining an open generally cylindrical hose clamp on a selected hose. The device extends generally about a longitudinal axis and has a retainer and a locator spaced axially from the retainer in side-by-said relationship. The locator and retainer are coupled together and the retainer is adapted to hold the clamp while the locator is adapted to engage the hose to maintain the device in position on the hose. As a result, the clamp can be positioned orthogonally relative to the hose and the assembly is then ready for engagement on a rigid tubular fitting with the locator positioned on the hose remote from the tubular fitting. This permits the hose to be engaged over the tubular fitting with no direct resistance from the retention device.

BRIEF DESCRIPTION OF THE DRAWINGS

The invention will be better understood with reference to the accompanying drawings in which.

BRIEF DESCRIPTION OF THE PREFERRED EMBODIMENT

Figure 1:
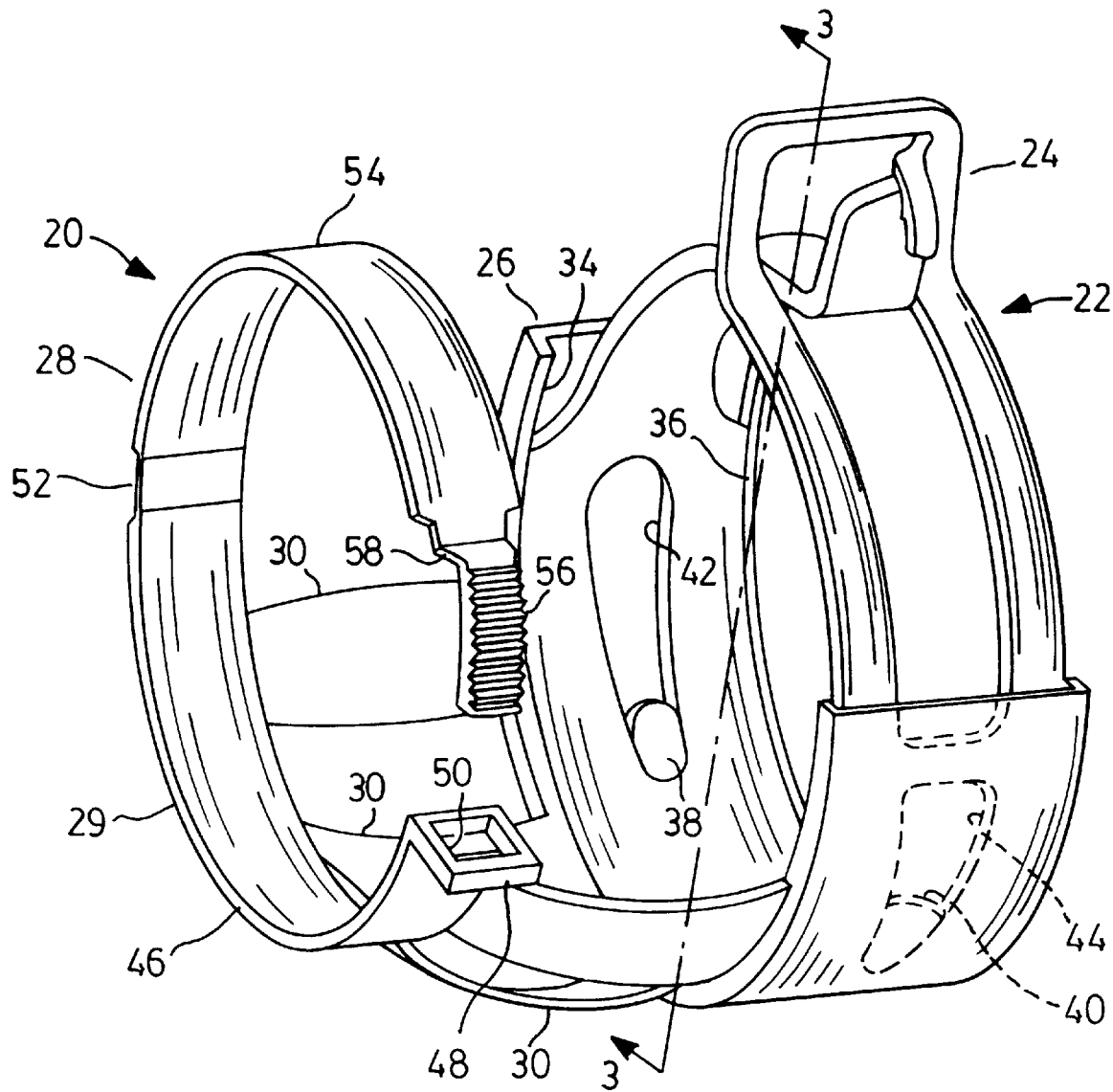
FIG. 1 is a perspective view of a device according to a preferred embodiment of the invention and shown in use with an exemplary pre-stressed clamp.

Reference is first made to FIG. 1 which illustrates an injection molded hose clamp retention device indicated generally by the numeral 20 and containing an exemplary hose clamp indicated generally by the numeral 22. The hose clamp is generally cylindrical and is of the pre-stressed type incorporating a latch structure 24 to hold the clamp in an open position for engagement over a hose, as will be described. It will be evident from the following description that the hose clamp is exemplary of a variety of clamps and that the retention device can be used with such clamps.

Figure 2:
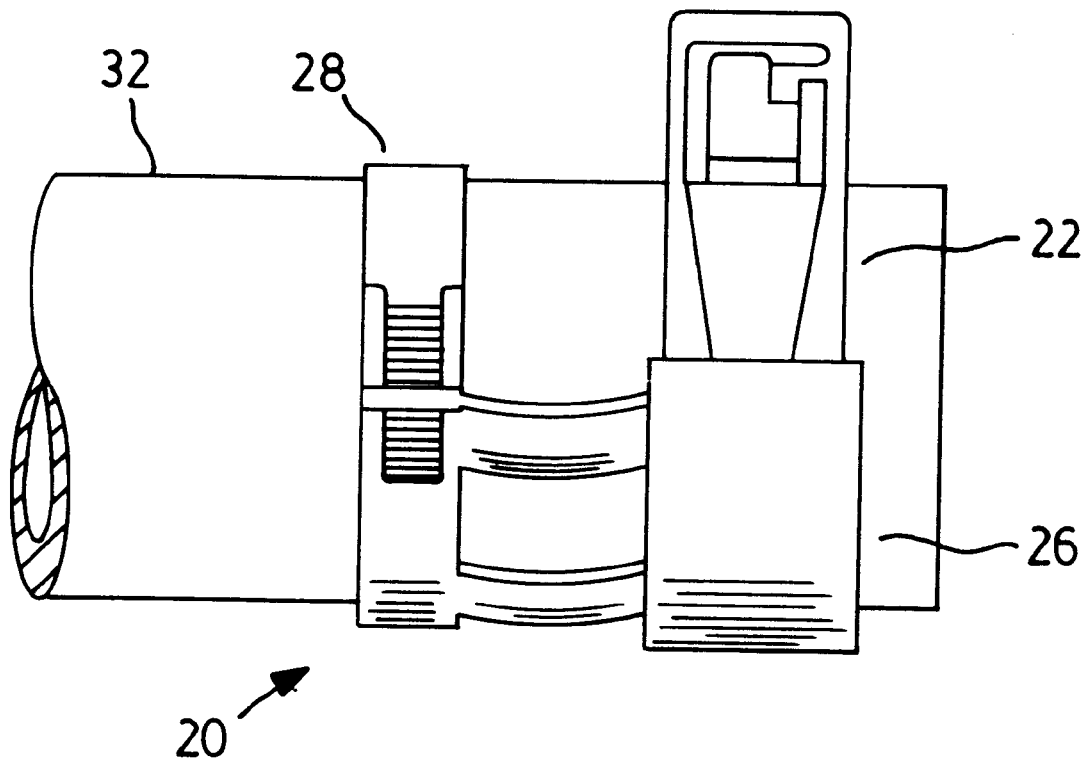
FIG. 2 is a side view of the device and clamp positioned on an end of a hose ready for use on a tubular fitting.

The retention device 20 consists essentially of a locator 26, a retainer 28 having a generally cylindrical and deformable belt 29 and four integral straps 30 connecting the locator 26 to the retainer 28. The locator 26 is generally C-shaped and is proportioned to be a snap-fit on the clamp 22. In use, the retainer 28 attaches the device to a hose 32 as seen in FIG. 2. Details of the structure will be described with reference to FIG. 1 and then the installation and use will be described with reference to FIGS. 2 and 3.

Returning to FIG. 1, the device extends generally about a longitudinal axis and the locator 26 and retainer 28 are spaced axially from one another and arranged in side-by-side relationship. The straps 30 extend axially. C-shaped locator 26 has a generally U-shaped cross-section including radially inwardly projecting lips 34, 36 proportioned to receive the clamp 22 between the lips. For further location, a pair of inwardly extending projections 38, 40 are provided on an inwardly facing surface of the locator for engagement in respective openings 42, 44 formed in the clamp. Consequently, when the clamp is engaged in the locator 26 by deforming the locator to receive the clamp, the projections 38, 40 locate the clamp angularly with respect to the locator, and the lips 34, 36 prevent axial movement. As mentioned previously, the exemplary clamp 22 is in an expanded or open condition retained in this form by the latch structure 24 ready to be released into a deployed position as will be described. However other types of clamps can be accommodated for conventional actuation.

The belt 29 forming part of the retainer 28 is essentially in two parts. A lower part 46 (as drawn) is generally semi-circular in cross-section and terminates at the free end in a receiver 48 extending radially outwards and defining a rectangular opening 50. This part of the belt is coupled to the straps 30 which consequently extend no more than about 180 degrees about the generally circular strap. At the other end of the part 46, a thinned portion 52 forms a living hinge with an upper part 54. This part is also generally semi-circular in cross-section and terminates at its free end in a toothed piece 56 attached by a radial projection 58 to the main part of the belt. The toothed piece is proportioned to engage in the rectangular opening 50 with the teeth projecting outwardly for engagement with an outer edge of the opening to retain the belt in a closed condition. The living hinge 52 allows the upper part to be moved for installation as will be described.

The relationship between the belt 29 and the locator 26 is maintained by the similar straps 30. These straps are spaced circumferentially so that they combine to maintain the stability of the belt relative to the locator 26 and consequently the axial spacing and side-by-said relationship of the locator 26 and retainer 28 is established by these belts. The lengths of the straps are chosen to create a selected separation between the belt 29 and the locator 26 as will also be described.

Assembly of the device on a hose will next be described with reference to FIG. 2 where it will be seen that the hose 32 has received the device 20 with clamp 22 snapped into the generally C-shaped locator 26. This locator extends more than 180 degrees with respect to the longitudinal axis of the device in order to hold the clamp in place. The assembly can be done in several ways. Because the belt 29 includes a hinge 52, this part can be left quite loose for simple engagement over the end of the hose, and then the hose is fed through the expanded or open clamp 22. The hose and clamp are selected so that the hose will slide through the clamp as is common in the art. The assembly with the clamp is positioned relative to the end of the hose in a predetermined position and the belt 29 is then collapsed by entering the toothed piece 56 into the opening 50. Next the belt upper and lower halves are pushed towards one another so that the teeth will pass through the opening 50 and find the tooth that applies the necessary compressive loading to affix the belt in position. If necessary, the belt can be provided with a surface roughness to enhance the frictional resistance and better locate the structure and the hose. A final assembly is shown in FIG. 2.

Figure 3:
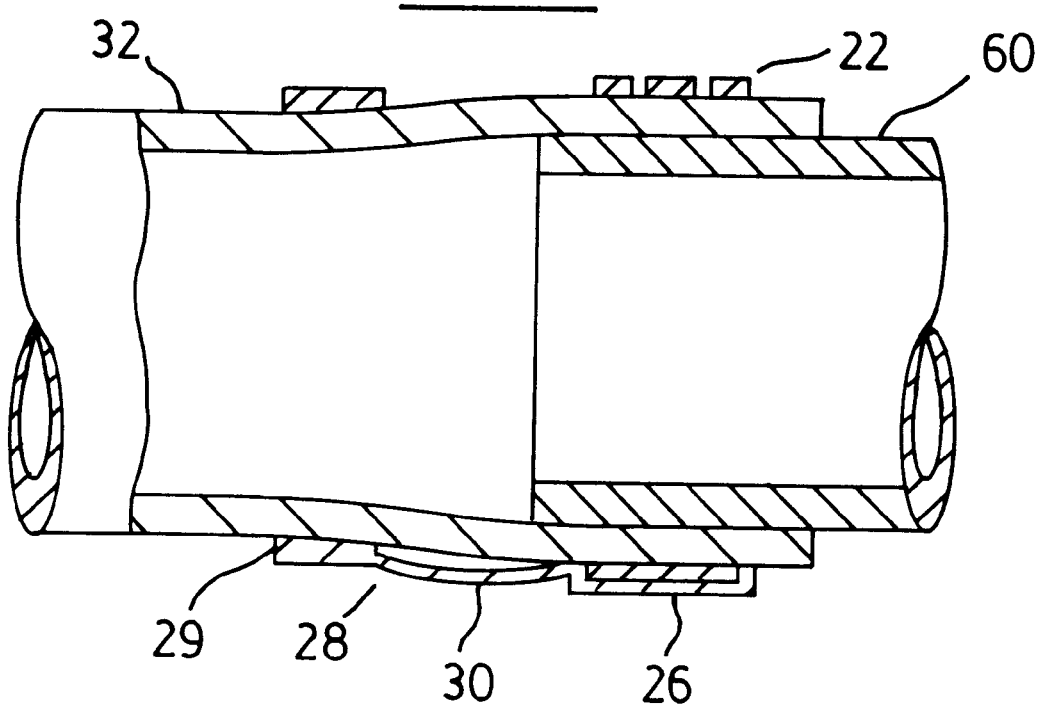
FIG. 3 is a sectional view taken generally on line 3—3 of FIG. 1 after the hose assembly of FIG. 2 has been engaged on a tubular fitting.

It will be evident that when the hose is to be engaged over a rigid tubular fitting such as that indicated at 60 in FIG. 3, the position of the clamp on the hose should be such that when the engagement takes place the clamp will compress the hose between the fitting and the clamp. In FIG. 3, the hose has been pushed over the fitting 60 resulting in some radial outward deformation of the hose. There is no real resistance to this deformation provided by the clamp because the clamp is in an expanded condition when this takes place. Also, the lengths of the straps 30 are chosen so that the belt 29 is not in a position where it will be affected by the deformation of the hose. After the engagement on the fitting 60 is completed, the clamp is deployed in the usual fashion so that the energy stored in the clamp compresses the hose about the fitting 60.

From FIGS. 2 and 3 it will be evident that the separation between the locator 26 and the retainer 28 is such that there is little likelihood of the clamp being misaligned on the hose. In other words, the clamp is naturally maintained in a generally orthogonal position with reference to the axis of the hose to ensure full orthogonal implementation of the clamp when it is deployed.

The retention device has been described as a one-piece injection molded structure. Clearly, the device can be manufactured differently and take many forms within the scope of the invention. For instance, the number, spacing and lengths of the straps 30 can be varied. If preferred, the straps could be combined into a single strap having sufficient width to maintain the locator and retainer in spacedapart and parallel relationship. All such variations will be evident to persons skilled in the art and are within the scope of the invention as claimed.

We claim:

1. A device for positioning and retaining an open generally cylindrical hose clamp on a selected hose in preparation for engaging the hose over a rigid tubular fitting, the device including:
    a C-shaped locator for receiving and holding the open hose clamp with the clamp disposed about an axis, the locator subtending an angle greater than 180 degrees to said axis and being resiliently deformable to receive and hold the clamp; and
    a retainer having a belt spaced axially from the locator and disposed about said axis and at least one connecting strap extending axially and coupled to the belt and to the locator to maintain the belt and the locator in orthogonal relationship relative to said axis, whereby on engaging the belt about said hose, the clamp is positioned by the retainer about the hose ready to engage the hose after the hose has been positioned over said rigid tubular fitting.

2. A device as claimed in claim 1 in which the device includes a plurality of straps extending axially and occupying less than 180 degrees of the circumference of the belt.

3. A device as claimed in claim 1 in which the belt includes a pair of ends, a receiver at one of the ends and a toothed piece at the other of the ends for engagement in the receiver to lock the belt on the hose and thereby locate the device axially on the hose.

4. A device as claimed in claim 3 in which the device includes a plurality of straps occupying less than 180 degrees of the circumference of the belt.

5. A device for positioning and retaining an open generally cylindrical hose clamp on a selected hose in preparation for engaging the hose over a rigid tubular fitting, the device being disposed about axis and including: a retainer and a C-shaped locator spaced from the retainers and at least one strap extending axially and coupling the locator to the retainer; the locator subtending an angle greater than 180 degrees to said axis and being resiliently deformable to receive and retain the clamp, and the retainer being adapted to engage the hose to maintain the device in position on the hose so that on assembly the device tends to maintain a relationship with the hose such that the clamp is orthogonally positioned relative to the hose ready for engagement with the hose after the hose has been positioned over said rigid tubular fitting.

6. A device as claimed in claim 5 in which the device includes a plurality of straps occupying less than 180 degrees of the circumference of the belt, the straps coupling the retainer to the locator.

7. A device as claimed in claim 5 in which the retainer includes a belt having inter-engaging ends for locking the belt on the hose in a selected position on the hose.

8. A device as claimed in claim 5 in which the retainer includes a belt having a pair of ends, a receiver at one of the ends and a toothed piece at the other of the ends for engagement in the receiver to lock the belt on the hose and thereby locate the device on the hose and hold the clamp in position ready to be deployed.

9. An assembly for use in connecting rigid tubular fittings to provide fluid flow between the fittings, the assembly including:
- an elongate hose having first and second ends for engagement over the respective fittings;
- a clamp in an open condition and positioned to slide freely on the hose and provide clearance for radial outward deflection of the hose when the hose is pushed on to one of the fittings; and
- a device for positioning and retaining the open clamp near one of the ends of the hose ready to be deployed to compress the hose on the respective one of the fittings, the device being disposed about an axis and having a C-shaped locator subtending an angle greater than 180 degrees to said axis and being resiliently deformable to receive and retain the clamp, a retainer adapted to engage the hose to maintain the device in position on the hose, and at least one strap extending between the locator and the retainer with the locator nearer an end of the hose so that the retainer is unaffected as the hose is engaged over a respective one of the fittings.

10. An assembly as claimed in claim 9 in which the device further includes a plurality of straps occupying less than 180 degrees of the circumference of the belt, the straps coupling the retainer to the locator.

11. An assembly as claimed in claim 9 in which the retainer includes a belt having a pair of ends, a receiver at one of the ends and a toothed piece at the other of the ends for engagement in the receiver to lock the belt on the hose and thereby locate the device on the hose and hold the clamp in position ready to be deployed.

* * * * *